United States Patent
Hara et al.

(10) Patent No.: US 8,599,521 B2
(45) Date of Patent: Dec. 3, 2013

(54) SWITCHING REGULATOR AND OPERATION CONTROL METHOD

(75) Inventors: Kiyohito Hara, Osaka (JP); Koichi Kawano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 389 days.

(21) Appl. No.: 12/485,330

(22) Filed: Jun. 16, 2009
(Under 37 CFR 1.47)

(65) Prior Publication Data

US 2009/0316311 A1    Dec. 24, 2009

(30) Foreign Application Priority Data

Jun. 24, 2008  (JP) .................................. 2008-164182

(51) Int. Cl.
*H02H 7/00* (2006.01)
*H02H 9/00* (2006.01)
*H02H 3/24* (2006.01)

(52) U.S. Cl.
USPC .............................................. 361/18; 361/92

(58) Field of Classification Search
USPC ...................................................... 361/18, 92
See application file for complete search history.

(56) References Cited

U.S. PATENT DOCUMENTS

| | | | | |
|---|---|---|---|---|
| 4,563,733 | A * | 1/1986 | Schlenk ........................ | 323/284 |
| 5,359,281 | A * | 10/1994 | Barrow et al. ................ | 323/284 |
| 5,514,951 | A * | 5/1996 | Halim et al. .................. | 323/281 |
| 5,798,635 | A * | 8/1998 | Hwang et al. ................. | 323/222 |
| 5,805,401 | A * | 9/1998 | Schuellein et al. ............ | 361/92 |
| 6,954,056 | B2 * | 10/2005 | Hoshino et al. .............. | 323/285 |
| 7,369,384 | B2 * | 5/2008 | Inaba ............................ | 361/91.1 |
| 7,443,641 | B2 * | 10/2008 | Suzuki ............................ | 361/18 |
| 7,447,601 | B2 * | 11/2008 | Lhermite et al. ............... | 702/60 |
| 7,515,393 | B2 * | 4/2009 | Bliley et al. ..................... | 361/92 |
| 7,535,206 | B2 * | 5/2009 | Kanakubo ..................... | 323/223 |
| 7,633,274 | B2 * | 12/2009 | Nishino ........................ | 323/222 |
| 7,663,852 | B2 * | 2/2010 | Balakrishnan et al. ......... | 361/92 |
| 7,746,318 | B2 * | 6/2010 | Shin et al. ..................... | 345/102 |
| 7,957,165 | B2 * | 6/2011 | Hasegawa et al. .............. | 363/49 |
| 2004/0145922 | A1 * | 7/2004 | Jutras et al. .................... | 363/18 |
| 2008/0136341 | A1 * | 6/2008 | Araki et al. ................ | 315/209 R |
| 2008/0197821 | A1 * | 8/2008 | Hasegawa et al. ............. | 323/238 |
| 2008/0298095 | A1 * | 12/2008 | Chuang et al. ............. | 363/21.12 |
| 2009/0256540 | A1 * | 10/2009 | Yang et al. .................... | 323/282 |
| 2009/0303641 | A1 * | 12/2009 | Abe ................................ | 361/18 |

FOREIGN PATENT DOCUMENTS

| | | |
|---|---|---|
| JP | 2005-78557 | 3/2005 |
| JP | 2009-55708 | 3/2009 |

* cited by examiner

*Primary Examiner* — Rexford Barnie
*Assistant Examiner* — Christopher Clark
(74) *Attorney, Agent, or Firm* — Cooper & Dunham LLP

(57) ABSTRACT

In a switching regulator, a low voltage malfunction prevention circuit controls operations of a PWM comparator and a output buffer circuit, such that when a power source voltage is lower than a predetermined value, a switching transistor is forcibly turned off, and when the power source voltage is greater than or equal to the predetermined value, the switching transistor is turned on/off in accordance with pulse signals from the PWM comparator. Furthermore, the low voltage malfunction prevention circuit generates a second reference voltage that is lower than a first reference voltage and that rises quickly in accordance with the rise of the power source voltage. The state of the power source voltage inside an IC is detected by comparing the first reference voltage with the second reference voltage.

13 Claims, 5 Drawing Sheets

SWITCHING REGULATOR AND OPERATION CONTROL METHOD

CROSS-REFERENCE TO RELATED APPLICATION

The present application is based on, and claims the priority of, Japanese Patent Application No. 2008-164182 filed with the Japanese Patent Office on Jun. 24, 2008, the entire contents of which are incorporated herein by reference.

BACKGROUND OF THE INVENTION

1. Field of the Invention

The present invention relates to a low-current-consuming switching regulator capable of quickly responding to variations in the output current and variations in the input voltage, and maintaining the output voltage at a predetermined voltage.

2. Description of the Related Art

An IC used for control operations (control-use IC) in a conventional switching regulator may degrade the system for supplying power from the power source due to a malfunction in control, in a generation transient state of the internal voltage of the IC resulting from the start/stop of the switching regulator. In a conventional switching regulator, in order to prevent such malfunction, a low voltage malfunction prevention circuit is used for forcibly turning off a switch element when the power source voltage drops below a specified voltage. In this case, as shown in FIG. 4, when the power source voltage becomes significantly low, and the internal power of the IC is not at a normal level, it cannot be accurately confirmed that the power source voltage has risen in a normal manner. Accordingly, the low voltage malfunction prevention circuit cannot operate normally.

Attempts have been made to solve this problem by providing two low voltage malfunction prevention circuits having different low voltage detection values (see, for example, patent document 1). One of the low voltage detection values is a value determined by characteristics of the power MOS-FET used for the switch element, which is typically used in the conventional technology. The other low voltage detection value is for detecting whether the power voltage has become significantly low, which is determined by a threshold voltage of a group of transistors constituting the switching regulator. That is, when the power source voltage is lower than the threshold voltage of the group of transistors constituting the control-use IC, the switch element is forcibly turned off. With such a configuration, the low voltage malfunction prevention circuit operates even when the power source voltage is significantly low, so that the operation being performed in this state can be forcibly turned off, thereby preventing the above-described malfunction.

Patent Document 1: Japanese Laid-Open Patent Application No. 2005-78557

The above method is performed by detecting a state where the power source voltage is lower than the voltage determined by the threshold voltage of the group of transistors constituting the switching regulator, and turning off the power MOS-FET constituting the switch element while such a state is being detected. However, when the power source voltage exceeds the threshold voltage of the group of transistors, the internal power of the IC may not necessarily have a normal voltage. When the internal power of the IC does not have a normal voltage, as shown in FIG. 5, there may be a period during which the circuit inside the IC including the low voltage malfunction prevention circuit becomes out-of-control. During such a period, a malfunction may occur, and the system may be degraded.

SUMMARY OF THE INVENTION

The present invention provides a switching regulator and an operation control method in which one or more of the above-described disadvantages are eliminated.

A preferred embodiment of the present invention provides a switching regulator and an operation control method capable of preventing an internal circuit of the IC including a low voltage malfunction prevention circuit from becoming out-of-control, by detecting whether the internal power of the IC has a normal voltage.

According to an aspect of the present invention, there is provided a switching regulator for converting an input power source voltage into a predetermined constant voltage and outputting the predetermined constant voltage as an output voltage, the switching regulator including a switch element configured to perform a switching operation so as to be turned on/off according to a control signal that has been input; an inductor configured to be charged by the power source voltage according to the switching operation of the switch element; a rectification element configured to discharge the inductor in the event that the switch element is turned off and the inductor stops being charged; a control circuit unit configured to control the switching operation of the switch element with the use of the control signal, so that a first proportional voltage that is proportional to the output voltage becomes a predetermined first reference voltage; and a low voltage malfunction prevention circuit unit configured to cause the control circuit unit to forcibly turn off the switch element so that the switch element switches to a cutoff status, in the event that the power source voltage is lower than a predetermined value, wherein the low voltage malfunction prevention circuit generates a second reference voltage that is lower than the first reference voltage and that rises more quickly than the first reference voltage when the power source voltage rises; and in the event that the first reference voltage is lower than the second reference voltage, or the power source voltage is lower than the predetermined value, the low voltage malfunction prevention circuit causes the control circuit unit to forcibly turn off the switch element so that the switch element switches to the cutoff status.

According to an aspect of the present invention, there is provided an operation control method performed by a switching regulator for converting an input power source voltage into a predetermined constant voltage and outputting the predetermined constant voltage as an output voltage, the switching regulator including a switch element configured to perform a switching operation so as to be turned on/off according to a control signal that has been input; an inductor configured to be charged by the power source voltage according to the switching operation of the switch element; and a rectification element configured to discharge the inductor in the event that the switch element is turned off and the inductor stops being charged, wherein the switching operation of the switch element is controlled so that a first proportional voltage that is proportional to the output voltage becomes a predetermined first reference voltage, the operation control method including the steps of generating a second reference voltage that is lower than the first reference voltage and that rises more quickly than the first reference voltage when the power source voltage rises; and forcibly turning off the switch element so that the switch element switches to a cutoff status, in the event that the first reference voltage is lower than the second reference voltage, or the power source voltage is lower than a predetermined value.

According to one embodiment of the present invention, a switching regulator and an operation control method are provided, capable of accurately detecting whether the internal power of a control-use IC of a switching regulator has a normal voltage, so that a circuit inside the IC including a low voltage malfunction prevention circuit unit is prevented from becoming out-of-control.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention.

First Embodiment

Figure 1:
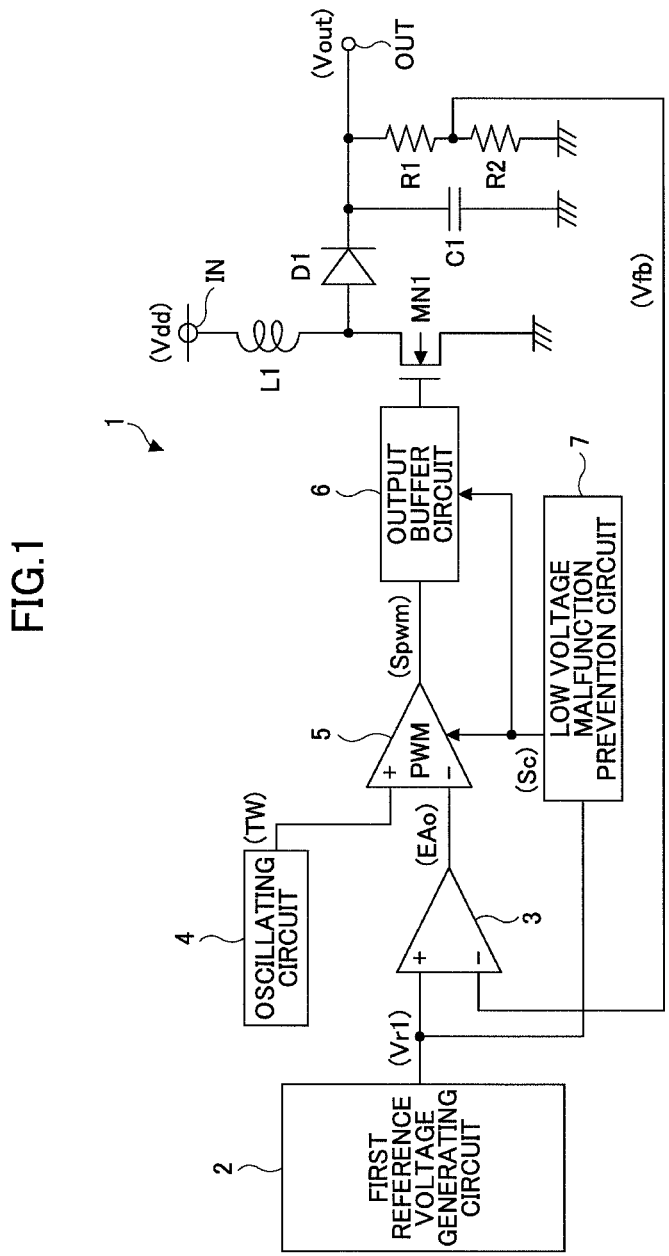
FIG. 1 illustrates a circuit example of a switching regulator according to a first embodiment of the present invention.

FIG. 1 illustrates a circuit example of a switching regulator according to a first embodiment of the present invention.

A switching regulator 1 shown in FIG. 1 is a step-up type switching regulator employing an asynchronous rectification method, which steps up a power source voltage Vdd which has been input to an input terminal IN to a predetermined constant voltage, and outputs this voltage as an output voltage Vout from an output terminal OUT.

As shown in FIG. 1, the switching regulator 1 includes an inductor L1, a switching transistor MN1, and a diode D1 for rectification. The switching transistor MN1 includes a NMOS transistor which implements switching to perform a step-up operation for stepping up the power source voltage Vdd in accordance with control signals input to the gate, and charges the inductor L1 with the power source voltage Vdd when the switching transistor MN1 is turned on and in a conductive state. Furthermore, the switching regulator 1 includes a first reference voltage generating circuit 2 for generating and outputting a predetermined first reference voltage Vr1; resistors R1 and R2 for detecting the output voltage; a capacitor C1 used for smoothing purposes; an error amplifying circuit 3; an oscillating circuit 4 for generating and outputting predetermined triangular wave signals TW; a PWM comparator 5; an output buffer circuit 6; and a low voltage malfunction prevention circuit 7.

The inductor L1 is connected between the power source voltage Vdd and the drain of the switching transistor MN1. The anode of the diode D1 is connected to the connection part of the inductor L1 and the drain of the switching transistor MN1. The cathode of the diode D1 is connected to the output terminal OUT. The capacitor C1 is connected in between the output terminal OUT and a ground voltage. The resistors R1 and R2 are connected in series in between the output terminal OUT and a ground voltage. A division voltage Vfb is output from the connection part of the resistors R1 and R2. The first reference voltage Vr1 is input to the noninverting input terminal of the error amplifying circuit 3. The division voltage Vfb is input to the inverting input terminal of the error amplifying circuit 3. The error amplifying circuit 3 outputs, from its output terminal, an error signal EAo which is generated by amplifying the voltage difference between the division voltage Vfb and the first reference voltage Vr1 that have been input.

The error signal EAo output from the error amplifying circuit 3 is input to the inverting input terminal of the PWM comparator 5, and the triangular wave signal TW is input to the noninverting input terminal of the PWM comparator 5. The PWM comparator 5 uses the triangular wave signals TW to perform PWM modulation on the error signals EAo output from the error amplifying circuit 3, and outputs pulse signals Spwm generated as a result of the modulation. The pulse signals Spwm are input to the gate of the switching transistor MN1 through the output buffer circuit 6. The low voltage malfunction prevention circuit 7 monitors the power source voltage Vdd, and when the power source voltage Vdd is below a predetermined value, the low voltage malfunction prevention circuit 7 outputs control signals Sc to the PWM comparator 5 and the output buffer circuit 6, for stopping the operations of the PWM comparator 5 and the output buffer circuit 6.

The switching transistor MN1 constitutes a switch element; the diode D1 constitutes a rectification element; and the low voltage malfunction prevention circuit 7 constitutes a low voltage malfunction prevention circuit unit. The first reference voltage generating circuit 2, the resistors R1 and R2, the error amplifying circuit 3, the oscillating circuit 4, the PWM comparator 5, and the output buffer circuit 6 constitute a control circuit unit. The division voltage Vfb constitutes a first proportional voltage. In the switching regulator 1, all of the circuits except for the inductor L1 and the capacitor C1 can be integrated into a single IC. In another case, all of the circuits except for the switching transistor MN1 and/or the diode D1, the inductor L1, and the capacitor C1 can be integrated into a single IC.

Figure 2:
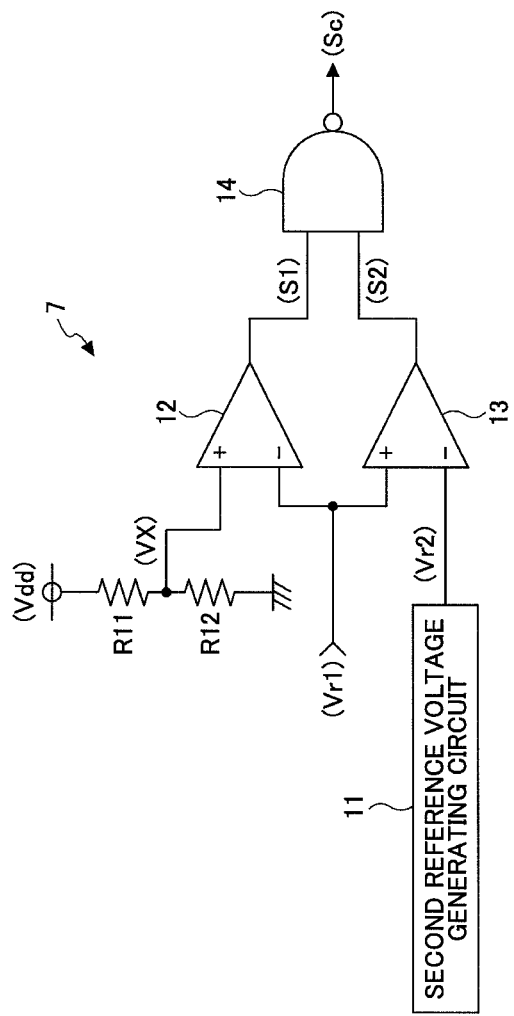
FIG. 2 illustrates a circuit example of a low voltage malfunction prevention circuit shown in FIG. 1.

FIG. 2 illustrates a circuit example of the low voltage malfunction prevention circuit 7.

As shown in FIG. 2, the low voltage malfunction prevention circuit 7 includes resistors R11 and R12 for dividing the power source voltage Vdd to generate and output a division voltage VX; a second reference voltage generating circuit 11 for generating and outputting a predetermined second reference voltage Vr2 which is lower than the first reference voltage Vr1; a first voltage comparing circuit 12; a second voltage comparing circuit 13; and a NAND circuit 14. The resistors R11 and R12 constitute a second proportional voltage generating circuit, and the division voltage VX constitutes a second proportional voltage.

The resistors R11 and R12 are connected in series between the power source voltage Vdd and a ground voltage. The division voltage VX output from the connection part of the resistors R11 and R12 is input to the noninverting input terminal of the first voltage comparing circuit 12. The first reference voltage Vr1 is input to the inverting input terminal of the first voltage comparing circuit 12 and the noninverting input terminal of the second voltage comparing circuit 13.

The output terminals of the first voltage comparing circuit 12 and the second voltage comparing circuit 13 are connected to the corresponding input terminals of the NAND circuit 14. Control signals Sc are output from the output terminal of the NAND circuit 14.

In such a configuration, in a stationary state, as the output voltage Vout increases, the voltage of the error signals EAo from the error amplifying circuit 3 decreases, and the duty cycle of the pulse signals Spwm from the PWM comparator 5 decreases. This consequently decreases the time during which the switching transistor MN1 is turned on, so that the output voltage Vout from the switching regulator 1 is decreased. Conversely, as the output voltage Vout from the switching regulator 1 decreases, the voltage of the error signals EAo from the error amplifying circuit 3 increases, and the duty cycle of the pulse signals Spwm from the PWM comparator 5 increases. This consequently increases the time during which the switching transistor MN1 is turned on, so that the output voltage Vout from the switching regulator 1 is increased. These operations are repeated so that the output voltage Vout is maintained at a predetermined level.

Figure 3:
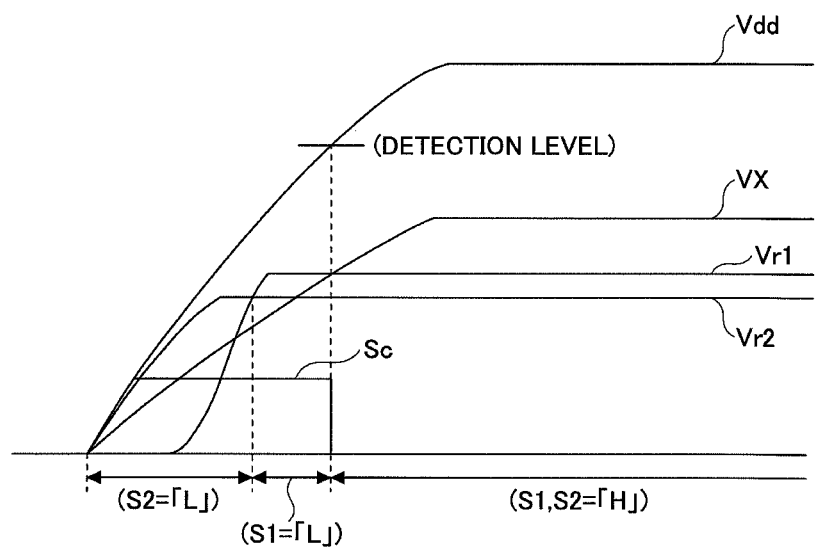
FIG. 3 illustrates an example of how the signals described with reference to FIGS. 1 and 2 change as the power source starts up.
Figure 4:
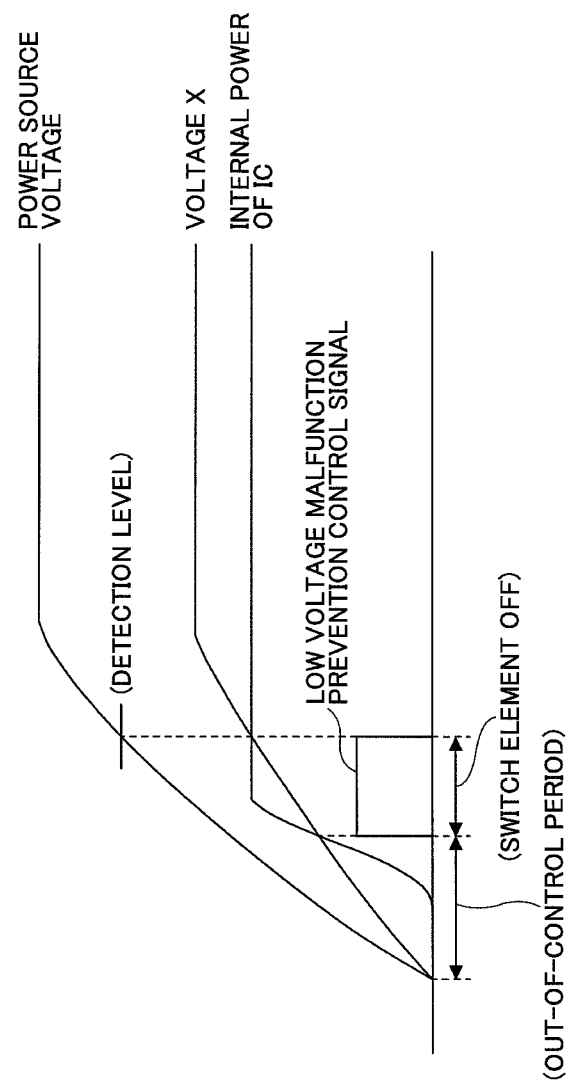
FIG. 4 illustrates an example of how the signals change as the power source starts up in a conventional switching regulator.
Figure 5:
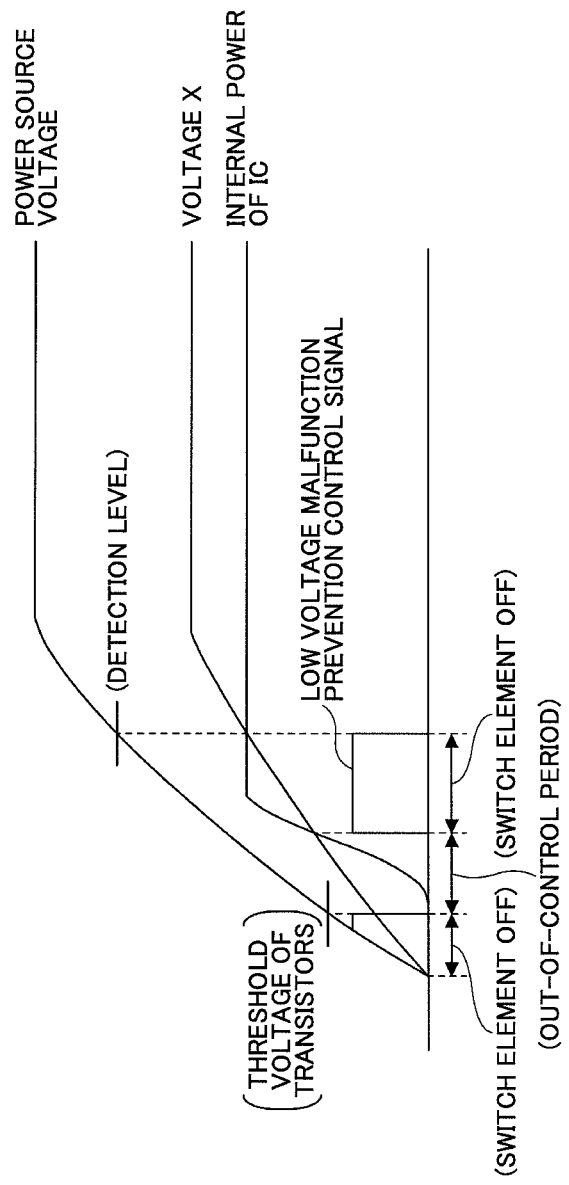
FIG. 5 illustrates another example of how the signals change as the power source starts up in a conventional switching regulator.

FIG. 3 illustrates an operation example of the low voltage malfunction prevention circuit 7 shown in FIGS. 1 and 2. A startup operation is taken as an example to describe an operation of the low voltage malfunction prevention circuit 7, With reference to FIG. 3.

The first reference voltage Vr1 is a signal for placing importance on the precision of the voltage, and the second reference voltage Vr2 is a signal for allowing the voltage to quickly rise in accordance with the rise of the power source voltage Vdd. The second reference voltage Vr2 can reach a specified value quicker than the first reference voltage Vr1. Thus, until the first reference voltage Vr1 reaches the specified value, i.e., until the first reference voltage Vr1 exceeds the second reference voltage Vr2, output signals S2 from the second voltage comparing circuit 13 are low-level, and control signals Sc output from the NAND circuit 14 are high-level. The PWM comparator 5 and the output buffer circuit 6 which have received high-level control signals Sc forcibly turn off the switching transistor MN1 so that the switching transistor MN1 is switched to a cutoff status.

When the first reference voltage Vr1 exceeds the second reference voltage Vr2, the output signals S2 from the second voltage comparing circuit 13 become high-level. In accordance with the output signals S1 from the first voltage comparing circuit 12 for detecting whether the power source voltage Vdd has reached a predetermined value, the control signals Sc fall from a high level to a low level. That is, when the division voltage VX becomes greater than or equal to the first reference voltage Vr1, the output signals S1 from the first voltage comparing circuit 12 rise from a low level to a high level, and the control signals Sc fall from a high level to a low level.

As described above, in the switching regulator according to the first embodiment, the low voltage malfunction prevention circuit 7 forcibly turns off the switching transistor MN1 when the power source voltage Vdd is less than a predetermined value. Furthermore, when the power source voltage Vdd is greater than or equal to the predetermined value, the low voltage malfunction prevention circuit 7 controls the operations of the PWM comparator 5 and the output buffer circuit 6 such that the switching transistor MN1 is turned on/off in accordance with pulse signals Spwm from the PWM comparator 5. Accordingly, the switching transistor MN1 can be turned off so as to be in a cutoff status until the internal power of the control-use IC in the switching regulator rises, thereby preventing malfunctions.

Furthermore, by setting the second reference voltage Vr2 so as to be slightly lower than the first reference voltage Vr1, and to quickly rise in accordance with the rise of the power source voltage Vdd, the rise of the internal power of the control-use IC in the switching regulator can be accurately detected.

In the above description, a step-up type switching regulator employing an asynchronous rectification method is taken as an example. However, the present invention is not so limited. The present invention is also applicable to a step-up type switching regulator employing a synchronous rectification method, a step-down type switching regulator, and an inverting type switching regulator. In these cases, the switching transistor, or both the switching transistor and the transistor for synchronous rectification, can be forcibly turned off so as to switch to a cutoff status, by control signals from the above described low voltage malfunction prevention circuit.

The present invention is not limited to the specifically disclosed embodiment, and variations and modifications may be made without departing from the scope of the present invention.

What is claimed is:

1. A switching regulator for converting an input power source voltage into a predetermined constant voltage and outputting the predetermined constant voltage as an output voltage, the switching regulator comprising:
    a switch element configured to perform a switching operation so as to be turned on/off according to a control signal that has been input;
    an inductor configured to be charged by the power source voltage according to the switching operation of the switch element;
    a rectification element configured to discharge the inductor when the switch element is turned off and the inductor stops being charged,
    wherein an input current from the power source voltage is equal to an inductor current of the inductor when the switch element is turned off;
    a control circuit unit configured to control the switching operation of the switch element with the use of the control signal, so that a first proportional voltage that is proportional to the output voltage becomes equal in value to a generated first reference voltage; and
    a low voltage malfunction prevention circuit configured to generate a second reference voltage that rises as the power source voltage rises and rises more quickly than the first reference voltage when the power source voltage rises and cause the control circuit unit to forcibly turn off the switch element so that the switch element switches to a cutoff status, wherein
    when the first reference voltage is lower than the second reference voltage, the low voltage malfunction prevention circuit causes the control circuit unit to forcibly turn off the switch element so that the switch element switches to the cutoff status.

2. The switching regulator according to claim 1, wherein the low voltage malfunction prevention circuit is configured to generate a second proportional voltage that is proportional to the power source voltage, and determine that the power source voltage is lower than a predetermined value when the second proportional voltage is lower than the first reference voltage.

3. The switching regulator according to claim 2, wherein the low voltage malfunction prevention circuit comprises:
    a second reference voltage generating circuit configured to generate and output the second reference voltage;

a second proportional voltage generating circuit configured to generate and output the second proportional voltage;

a first voltage comparing circuit configured to compare the first reference voltage with the second proportional voltage, and generate and output a pertinent signal indicating a result of the comparison;

a second voltage comparing circuit configured to compare the first reference voltage with the second reference voltage, and generate and output a pertinent signal indicating a result of the comparison; and a control signal generating circuit configured to generate the control signal for the control circuit unit based on the signals from the first voltage comparing circuit and the second voltage comparing circuit, and output the generated control signal, wherein when the control signal generating circuit detects that the first reference voltage is lower than the second reference voltage, or the power source voltage is lower than the predetermined value, whereby the detection is made based on the signals from the first voltage comparing circuit and the second voltage comparing circuit, the control signal generating circuit generates and outputs the control signal to cause the control circuit unit to forcibly turn off the switch element so that the switch element switches to the cutoff status.

4. An operation control method performed by a switching regulator for converting an input power source voltage into a predetermined constant voltage and outputting the predetermined constant voltage as an output voltage, the switching regulator comprising:

a switch element configured to perform a switching operation so as to be turned on/off according to a control signal that has been input;

an inductor configured to be charged by the power source voltage according to the switching operation of the switch element; and a rectification element configured to discharge the inductor when the switch element is turned off and the inductor stops being charged, wherein an input current from the power source voltage is equal to an inductor current of the inductor when the switch element is turned off and wherein:

the switching operation of the switch element is controlled so that a first proportional voltage that is proportional to the output voltage becomes equal in value to a generated first reference voltage, the operation control method comprising the steps of:

generating a second reference voltage that rises as the power source voltage rises and rises more quickly than the first reference voltage when the power source voltage rises; and comparing the first reference voltage with the second reference voltage, and forcibly turning off the switch element so that the switch element switches to a cutoff status, when the first reference voltage is lower than the second reference voltage.

5. The operation control method according to claim 4, further comprising the steps of:

generating a second proportional voltage that is proportional to the power source voltage; and determining that the power source voltage is lower than a predetermined value when the second proportional voltage is lower than the first reference voltage.

6. A switching method, comprising:

performing a switching operation by a switch element so as to be turned on/off according to an input control signal;

charging an inductor by a power source voltage according to the switching operation;

discharging the inductor when the switch element is turned off and the inductor stops being charged, wherein an input current from the power source voltage is equal to an inductor current of the inductor when the switch element is turned off;

controlling the switching operation such that a first proportional voltage that is proportional to an output voltage becomes equal in value to a generated first reference voltage;

generating a second reference voltage that is lower than the first reference voltage and that rises as the power source voltage rises and rises more quickly than the first reference voltage when the power source voltage rises; and comparing the first reference voltage with the second reference voltage, and forcibly turning off the switch element so that the switch element switches to a cutoff status, when the first reference voltage is lower than the second reference voltage.

7. The switching regulator according to claim 1, wherein the input power source voltage is stepped up to the output voltage.

8. The switching regulator according to claim 1, wherein the rectification element is an asynchronous rectification element.

9. The switching regulator according to claim 1, wherein the switch element is an NMOS transistor.

10. The switching regulator according to claim 1, wherein the control circuit unit is formed on an integrated circuit.

11. The switching regulator according to claim 1, wherein the control circuit unit and the switch element are formed on an integrated circuit.

12. The switching regulator according to claim 1, wherein the control circuit unit, the rectification element and the switch element are formed on an integrated circuit.

13. The switching regulator according to claim 1, wherein the low voltage malfunction prevention circuit comprises:

a comparing circuit that compares the first reference voltage with the second reference voltage, and generates and outputs a comparison result signal indicating a result of the comparison, wherein when the first reference voltage is lower than the second reference voltage, the comparison result signal output by the comparing circuit causes the control circuit unit to forcibly turn off the switch element so that the switch element switches to the cutoff status.

* * * * *